United States Patent
Foger et al.

(10) Patent No.: US 6,841,279 B1
(45) Date of Patent: Jan. 11, 2005

(54) FUEL CELL SYSTEM (75) Inventors: Karl Foger, Kew (AU); Khaliq Ahmed, Rowville (AU)

(73) Assignee: Ceramic Fuel Cells Ltd., Noble Park (AU)

( * ) Notice: Subject to any disclaimer, the term of this patent is extended or adjusted under 35 U.S.C. 154(b) by 86 days.

(21) Appl. No.: 10/049,705

(22) PCT Filed: Aug. 16, 2000

(86) PCT No.: PCT/AU00/00974

§ 371 (c)(1),
(2), (4) Date: Jun. 17, 2002

(87) PCT Pub. No.: WO01/13452

PCT Pub. Date: Feb. 22, 2001

(30) Foreign Application Priority Data

Aug. 16, 1999 (AU) ................................................ PQ2234

(51) Int. Cl.$^7$ .............................. H01M 8/04; C10L 3/00
(52) U.S. Cl. .............................. 429/17; 429/20; 429/13; 48/127.7
(58) Field of Search .............................. 429/13, 17, 19, 429/12, 26, 20, 40; 422/187, 188, 190; 48/127.1, 127.7; 518/702

(56) References Cited

U.S. PATENT DOCUMENTS

| 3,488,226 A | | 1/1970 | Baker et al. |
| 5,034,287 A | | 7/1991 | Kunz |
| 5,198,310 A | | 3/1993 | Fleming et al. |
| 5,302,470 A | * | 4/1994 | Okada et al. .................. 429/17 |

FOREIGN PATENT DOCUMENTS

| EP | 0435724 A2 | 7/1991 |
| EP | 0673074 A1 | 2/1995 |
| JP | 08048501 A | 2/1996 |

* cited by examiner

Primary Examiner—Raymond Alejandro
(74) Attorney, Agent, or Firm—Dorsey & Whitney LLP (57) ABSTRACT

A fuel cell produces electricity by reacting a higher carbon hydrocarbon fuel with steam in a steam pre-reformer, whose temperature does not exceed 500° C. A fuel stream is produced that includes hydrogen and not less than about 20% by volume methane, measured on a wet basis. The fuel stream and an oxidant are supplied to a high temperature fuel cell in which the methane is reformed. The fuel cell produces electricity by reacting the fuel stream at a fuel cell anode, and by reacting the oxidant at a fuel cell cathode.

21 Claims, 2 Drawing Sheets

FUEL CELL SYSTEM

TECHNICAL FIELD

The present invention relates to fuel cells and is particularly concerned with the fuel supply to a fuel cell electrical power generating system.

BACKGROUND ART

Fuel cells convert gaseous fuels (such as hydrogen, natural gas and gasified coal) via an electrochemical process directly into electricity. A fuel cell continuously produces power when supplied with fuel and oxidant, normally air. A typical fuel cell consists of an electrolyte (ionic conductor, $H^+$, $o^{2-}$, $CO_3^{2-}$ etc.) in contact with two electrodes (mainly electronic conductors). On shorting the cell through an external load, fuel oxidises at the anode resulting in the release of electrons which flow through the external load and reduce oxygen at the cathode. The charge flow in the external circuit is balanced by ionic current flows within the electrolyte. Thus, at the cathode oxygen from the air or other oxidant is dissociated and converted to oxygen ions which migrate through the electrolyte membrane and react with the fuel at the anode/electrolyte interface. The voltage from a single cell under load conditions is in the vicinity of 0.6 to 1.0 V DC and current densities in the range 100 to 1000 $mAcm^{-2}$ can be achieved.

Several different types of fuel cells have been proposed. Amongst these, the solid oxide fuel cell (SOFC) is regarded as the most efficient and versatile power generation system, in particular for dispersed power generation, with low pollution, high efficiency, high power density and fuel flexibility. SOFC's operate at elevated temperatures, for example 700–1000° C. Other fuel cells which operate at elevated temperatures include the molten carbonate fuel cell requiring a minimum temperature of 650° C. However, SOFC's are the primary interest for the invention and further discussion herein will be mainly directed to these without intending to be limited in any way.

Numerous SOFC configurations are under development, including the tubular, the monolithic and the planar design. The planar or flat plate design is the most widely investigated. Single planar SOFC's are connected via interconnects or gas separators to form multi-cell units, sometimes termed fuel cell stacks. Gas flow paths are provided between the gas separators and respective electrodes, for example by providing gas flow channels in the gas separators. In a fuel cell stack the components—electrolyte/electrode laminates and gas separator plates are fabricated individually and then stacked together. With this arrangement, external and internal co-flow, counter-flow and cross-flow manifolding options are possible for the gaseous fuel and oxidant.

Traditionally hydrogen, usually moistened with steam, has been used as a fuel cell fuel. However, in order to be economically viable the fuel must be as cheap as possible. One relatively cheap source of hydrogen is natural gas, primarily methane with a small proportion of heavy hydrocarbons ($C_2+$). Natural gas is commonly converted to hydrogen in a steam reforming reaction, but the reaction is endothermic and, because of the stability of methane, requires a reforming temperature of at least about 650° C. for substantial conversion and a higher temperature for complete conversion. While high temperature fuel cell systems produce heat which must be removed, heat exchangers capable of transferring thermal energy at the required level of at least about 650° C. from the fuel cells to a steam reformer are expensive. Thus, hydrogen produced by steam reforming natural gas may not be a cheap source of fuel.

One proposal of a fuel cell electricity generation process in which a hydrocarbon fuel is converted to a fuel cell fuel stream including hydrogen in a steam pre-reformer is disclosed in EP-A-0435724. The temperature in the pre-reformer is described as 700 to 850° C. with a resultant product-gas composition of 65–80 vol % $H_2$, 5–20 vol % CO, and 5–25 vol % $CO_2$.

Another such proposal is disclosed in U.S. Pat. No. 5,302,470 in which the steam pre-reforming reaction is said to be carried out under similar conditions to those of known steam reforming reactions: for example, an inlet temperature of about 450 to 650° C., an outlet temperature of about 650 to 900° C., and a pressure of about 0 to 10 $kgtcm^2$.G to produce a fuel cell fuel stream which is composed mainly of hydrogen and is fed to the fuel cell anode via a carbon monoxide shift converter.

Hydrocarbon fuels suggested for use in the above two proposals include, in addition to natural gas, methanol, kerosene, naphtha, LPG and town gas.

It has been proposed to alleviate the aforementioned problem of the cost of substantially complete steam pre-reforming of methane by using natural gas as a fuel source for a high temperature planar fuel cell stack and subjecting the natural gas to steam reforming within the stack, at a temperature of at least about 650° C., using catalytically active anodes. However, given the endothermic nature of the methane steam reforming reaction, too much methane in the fuel stream can lead to excessive cooling of the fuel cell stack. To alleviate this problem the fuel stream has been restricted to a maximum of about 25% methane with the natural gas being subjected to partial steam pre-reforming at elevated temperatures approaching 700° C. upstream of the fuel cell stack.

Another process for producing electricity in a fuel cell from hydrocarbon fuels such as gasified coal, natural gas, propane, naphtha or other light hydrocarbons, kerosene, diesel or fuel oil is described in EP-A-0673074. As described in that specification, the process involves steam pre-reforming approximately 5 to 20% of the hydrocarbon fuel at a temperature of at least 500° C. after start-up to convert ethane and higher hydrocarbons in that fraction to methane, hydrogen and oxides of carbon and to achieve a measure of methane pre-reforming in that fraction to oxides of carbon and hydrogen. Steam pre-reforming at this lower temperature alleviates carbon deposition in the pre-reformer. The hydrocarbon fuel with the steam pre-reformed fraction is then supplied to fuel inlet passages of the fuel cell stack which are coated with or contain a catalyst for steam reforming of the methane and remaining hydrocarbon fuel at 700–800° C. into hydrogen and oxides of carbon which are supplied to the anodes in the fuel cell stack.

Indirect internal steam reforming of the remaining hydrocarbon fuel within the fuel inlet passages is said to allow the use of reforming catalysts within the fuel inlet passages which are less likely to produce coking or carbon deposits from the internal steam reforming of the higher hydrocarbons than nickel cermet anodes. It is believed that steam pre-reforming of the hydrocarbon fuel in the described temperature range is restricted to 5 to 20% of the fuel in order to relatively increase the level of hydrogen in the fuel stream to the fuel cell stack and thereby alleviate carbon deposition when the fuel is internally reformed in the stack.

SUMMARY OF THE INVENTION

According to the present invention there is provided a process for producing electricity in a fuel cell which comprises reacting a higher carbon ($C_{2+}$) hydrocarbon fuel with steam in a steam pre-reformer at a temperature in the pre-reformer of no greater than 500° C. to produce a fuel stream including hydrogen and no less than about 20% by volume methane measured on a wet basis, and supplying the fuel stream and an oxidant to a high temperature fuel cell in which the methane is reformed and electricity is produced by reacting the fuel stream at an anode of the fuel cell and reacting the oxidant at a cathode of the fuel cell.

By the present invention, a substantially wider source of fuel may be used for the fuel cell than just methane and/or hydrogen, including ethane and liquid higher hydrocarbons such as propane, butane, liquefied petroleum gas (LPG), gasoline (petrol), diesel, kerosene, fuel oil, jet oil, naphtha and mixtures of these, while a lower temperature of no greater than 500° C. may be used for steam pre-reforming the higher hydrocarbon fuel source since there is no requirement to reform any methane in the steam pre-reformer. This permits a relatively small pre-reformer reactor to be used which, combined with the reduced maximum operating temperature of 500° C., enables a simplified and therefore cheaper pre-reformer system to be adopted. Such low temp steam pre-reforming also alleviates carbon deposition in the re-reformer.

Steam pre-reforming is conveniently performed at atmospheric pressure, but high pressures may be adopted if desired, for example up to 10 kgcm$^{-2}$G.

The fuel source may include non-higher hydrocarbons, such as methane, but preferably the higher hydrocarbons form the major component of the fuel source. The preferred fuel is selected from LPG, gasoline (petrol) and diesel.

Steam pre-reforming of the higher hydrocarbon fuel source is preferably performed at a temperature no greater than about 450° C., more preferably in a range of about 250 to 450° C., and, depending upon the fuel and other process parameters, most preferably in a range of about 300 to 400° C.

The relatively low maximum temperature in the steam pre-reformer tends to favour methane formation over the reforming catalyst in the reactions:

Thus, methane is formed by steam reforming of the higher hydrocarbons to form carbon monoxide, carbon dioxide and hydrogen followed by further reaction to methane. The overall steam pre-reforming process may therefore be considered at least in part as a methane generation process.

In one embodiment, at 300 to 400° C. propane, $C_3H_8$, the principal component of LPG, may be steam pre-reformed to $CH_4$, CO, $CO_2$ and $H_2$. The $CH_4$ in this fuel stream is then internally reformed within the fuel cell in the presence of steam during the oxidation reaction at the anode to produce a waste stream of $CO_2$ and $H_2O$. The temperature in the fuel cell should be at least 650° C., more preferably at least 700° C. to ensure substantially complete reforming of the methane. In an SOFC the temperature is likely to be at least 700° C. so that complete reforming of the methane is likely to be achieved.

Generally, the steam pre-reforming process will be carried out such that the $C_{2+}$ hydrocarbon fuel is resident over the reforming catalyst for a sufficient time to ensure at least substantially complete conversion of the $C_{2+}$ hydrocarbons, for example to less than about 0.1% by volume in the fuel stream from the pre-reformer. This alleviates deposition of carbon on the anode when heavier hydrocarbons are reformed on the anode. However, some $C_{2+}$ hydrocarbons may be present in the fuel stream and preferably there is 97.5% or greater conversion of the $C_{2+}$ hydrocarbons in the steam pre-reforming. More preferably, there is no more than about 0.5 vol % $C_{2+}$ hydrocarbons present in the fuel stream to the anode measured on a water basis. It is believed that reacting a fuel stream containing a substantial proportion of methane at the anode can produce higher voltages from the fuel cell than reacting hydrogen alone, and thereby improve the efficiency of the fuel cell.

Generally the methane content of the fuel stream will be at least 25% by volume, more preferably at least about 40% by volume, even more preferably at least about 50% by volume, and most preferably at least about 60% by volume, measured on a wet basis. In a preferred embodiment, other than possibly moisture, $CH_4$ forms the major component of the fuel stream to the fuel cell.

These levels of methane have the potential to cause excessive cooling of the fuel cell as a result of the endothermic methane internal steam reforming reaction. This problem is particularly likely to be encountered in a wholly ceramic SOFC fuel cell stack due to the low thermal conductivity of ceramic materials, but can be alleviated by incorporating metal or metallic components in the fuel cell stack, for example as the gas separators between individual fuel cells, to improve the thermal conductivity across the stack. Alternatively, or in addition, other means may be provided to alleviate excessive cooling at the fuel entry edge of each fuel cell assembly, including preheating of the fuel stream.

Advantageously, in the process of the invention waste heat from the fuel cell is recycled to the steam pre-reformer, which is preferably operated adiabatically. Since the pre-reformer is only required to operate at a maximum temperature of 500° C., any heat exchanger transferring the waste heat to the reformer may be of relatively simple construction and be formed of relatively low-cost materials.

A variety of different steam reformers have been proposed and any of these may be adopted for the pre-reformer, bearing in mind the maximum operating temperature of 500° C., and the fact that the pre-reformer is effectively acting as a methane generator. The common pre-reformer catalyst is nickel-based, but may comprise, for example, platinum, rhodium, other precious metal, or a mixture of any of these.

Generally, the heavy hydrocarbon fuel will pass through a desulphurising step upstream of the steam pre-reformer in order to alleviate sulphur poisoning the pre-reformer catalyst and/or the anode. Desulphurising of heavy hydrocarbon fuels is well known and will not be described further herein.

Preferably, the anode in the fuel cell comprises a nickel material, such as a nickel/zirconia cermet, which is used to catalyst the reforming reaction in the fuel cell. The fuel cell and its associated assembly can take any suitable form provided it operates at a temperature of at least 650° C. to provide at least substantial conversion of the methane in the internal reforming reaction. By way of example only, several different planar SOFC components and systems, SOFCs and materials are described in our International Patent Applications PCT/AU96/00140 (and corresponding national phase U.S. Pat. No. 5,942,3491), PCT/AU96/00594 (and corresponding national phase U.S. patent application Ser. No. 09/155,061, now U.S. Pat. No. 6,280,868), PCT/AU98/100437 (and corresponding national phase U.S. patent application Ser. No. 09/445,735, now U.S. Pat. No. 6,492,053), PCT/AU98/00719 (and corresponding national phase U.S.

patent application Ser. No. 09/486,501, now U.S. Pat. No. 6,444,340), and PCT/AU98/00956 (and corresponding national phase U.S. patent application Ser. No. 09/544,709, now U.S. Pat. No. 6,294,131), the contents of which are incorporated herein by reference. Other disclosures appear in our International patent applications PCT/AU99/01140, PCT/AU00/00630 and PCT/AU00/00631.

Generally, the fuel cell to which the fuel stream is supplied will be one of multiple fuel cells to which the fuel stream is also supplied, commonly called a fuel cell stack in the case of planar SOFCs. However, the invention also extends to the process being performed using a single fuel cell.

Commonly, steam reforming of hydrocarbons is carried out at a steam to carbon (S/C) ratio of greater than 2. In the present invention, this however would result in significant dilution of the fuel with steam and thus reduction in the fuel value. For example, for butane ($C_4H_{10}$), eight volume parts of steam must be added to one volume part of fuel for an S/C ratio of 2. For diesel ($C_{10}$), twenty parts of steam must be added to one part of fuel to achieve an S/C ratio of 2, with the result that there is strong fuel dilution, leading to inefficient electricity production. Preferably therefore, the S/C ratio in the pre-reformer is below 1.5, more preferably below 1.25 and most preferably below 1.

Potential carbon deposition problems at the proposed low steam to carbon ratios are alleviated by the mild conditions (temperature no greater than 500° C.) used in the pre-reformer. If pre-reforming is carried out at very low steam to carbon ratios, additional steam may be introduced to the fuel stream entering the fuel cell. Advantageously, the addition of steam may be provided by recycling some of the anode exhaust stream.

The advantages of a relatively low S/C ratio and a relatively low temperature in the pre-reformer may be seen from the thermodynamic equilibrium molar compositions of LPG and gasoline reformed at the identified maximum temperatures given in Tables 1 and 2, respectively, in which SIC is the steam to hydrocarbon carbon ratio. For example, S/C equals 1.0 is equivalent to 3.15 moles of steam for every mole of LPG or to 7.93 moles of steam for every mole of gasoline.

TABLE 1

Molar Compositions of Reformed LPG (Assumed to be 85% propane and 15% butane)

| S/C | 0.5 | 1.0 | 1.5 | 2.0 | 2.5 |
|---|---|---|---|---|---|
| Temp. | | | 200° C. | | |
| $CH_4$ | 0.7133 | 0.4965 | 0.3807 | 0.3085 | 0.2591 |
| $C_2^+$ | 4.0E−06 | 1.1E−06 | 5.7E−07 | 2.4E−08 | 3.1E−12 |
| $H_2O$ | 0.1347 | 0.3923 | 0.5306 | 0.6169 | 0.6759 |
| $H_2$ | 0.0041 | 0.0069 | 0.0080 | 0.0086 | 0.0090 |
| CO | 8.2E−05 | 1.3E−05 | 8.9E−06 | 6.6E−06 | 5.3E−06 |
| $CO_2$ | 0.1479 | 0.1042 | 0.0807 | 0.0660 | 0.0560 |
| Total | 1.0000 | 1.0000 | 1.0000 | 1.0000 | 1.0000 |
| Temp. | | | 250° C. | | |
| $CH_4$ | 0.7091 | 0.4909 | 0.3749 | 0.3028 | 0.2536 |
| $C_2^+$ | 6.9E−06 | 1.9E−06 | 9.8E−07 | 8.8E−08 | 3.1E−12 |
| $H_2O$ | 0.1310 | 0.3845 | 0.5206 | 0.6057 | 0.6637 |
| $H_2$ | 0.0107 | 0.0182 | 0.0210 | 0.0224 | 0.0234 |
| CO | 0.0002 | 8.7E−05 | 5.8E−05 | 4.4E−05 | 3.6E−05 |
| $CO_2$ | 0.1490 | 0.1064 | 0.0834 | 0.0690 | 0.0592 |
| Total | 1.0000 | 1.0000 | 1.0000 | 1.0000 | 1.0000 |
| Temp. | | | 300° C. | | |
| $CH_4$ | 0.7007 | 0.4797 | 0.3635 | 0.2918 | 0.2430 |
| $C_2^+$ | 1.1E−05 | 3.0E−06 | 1.5E−06 | 9.1E−07 | 3.1E−12 |
| $H_2O$ | 0.1239 | 0.3691 | 0.5013 | 0.5839 | 0.6405 |
| $H_2$ | 0.0238 | 0.0403 | 0.0463 | 0.0493 | 0.0510 |
| CO | 0.0010 | 0.0004 | 0.0003 | 0.0002 | 0.0002 |
| $CO_2$ | 0.1506 | 0.1105 | 0.0886 | 0.0748 | 0.0653 |
| Total | 1.0000 | 1.0000 | 1.0000 | 1.0000 | 1.0000 |
| Temp. | | | 350° C. | | |
| $CH_4$ | 0.6855 | 0.4606 | 0.3448 | 0.2738 | 0.2258 |
| $C_2^+$ | 1.6E−05 | 4.3E−06 | 2.1E−06 | 1.3E−06 | 3.0E−12 |
| $H_2O$ | 0.1127 | 0.3437 | 0.4694 | 0.5486 | 0.6031 |
| $H_2$ | 0.0458 | 0.0772 | 0.0880 | 0.0930 | 0.0956 |
| CO | 0.0040 | 0.0017 | 0.0012 | 0.0009 | 0.0008 |
| $CO_2$ | 0.1520 | 0.1168 | 0.0966 | 0.0837 | 0.0747 |
| Total | 1.0000 | 1.0000 | 1.0000 | 1.0000 | 1.0000 |
| Temp. | | | 400° C. | | |
| $CH_4$ | 0.6602 | 0.4318 | 0.3172 | 0.2478 | 0.2013 |
| $C_2^+$ | 2.3E−05 | 5.8E−06 | 2.8E−06 | 1.6E−06 | 2.9E−12 |
| $H_2O$ | 0.0981 | 0.3076 | 0.4243 | 0.4989 | 0.5510 |
| $H_2$ | 0.0783 | 0.1307 | 0.1475 | 0.1547 | 0.1579 |
| CO | 0.0131 | 0.0058 | 0.0041 | 0.0032 | 0.0027 |

TABLE 1-continued

Molar Compositions of Reformed LPG (Assumed to be 85% propane and 15% butane)

| | | | | | |
|---|---|---|---|---|---|
| $CO_2$ | 0.1503 | 0.1242 | 0.1069 | 0.0954 | 0.0871 |
| Total | 1.0000 | 1.0000 | 1.0000 | 1.0000 | 1.0000 |
| Temp. | | | 450° C. | | |
| $CH_4$ | 0.6196 | 0.3919 | 0.2804 | 0.2139 | 0.1699 |
| $C_2^+$ | 2.9E−05 | 7.2E−06 | 3.3E−06 | 2.8E−12 | 2.8E−12 |
| $H_2O$ | 0.0824 | 0.2627 | 0.3683 | 0.4375 | 0.4869 |
| $H_2$ | 0.1228 | 0.1995 | 0.2229 | 0.2318 | 0.2349 |
| CO | 0.0352 | 0.0166 | 0.0119 | 0.0096 | 0.0082 |
| $CO_2$ | 0.1399 | 0.1292 | 0.1165 | 0.1072 | 0.1001 |
| Total | 1.0000 | 1.0000 | 1.0000 | 1.0000 | 1.0000 |
| Temp. | | | 500° C. | | |
| $CH_4$ | 0.5584 | 0.3395 | 0.2343 | 0.1727 | 0.1325 |
| $C_2^+$ | 3.3E−05 | 7.9E−06 | 3.4E−06 | 1.8E−06 | 2.6E−12 |
| $H_2O$ | 0.0671 | 0.2137 | 0.3062 | 0.3698 | 0.4171 |
| $H_2$ | 0.1816 | 0.2802 | 0.3091 | 0.3186 | 0.3203 |
| CO | 0.0772 | 0.0407 | 0.0300 | 0.0243 | 0.0207 |
| $CO_2$ | 0.1157 | 0.1259 | 0.1204 | 0.1146 | 0.1094 |
| Total | 1.0000 | 1.0000 | 1.0000 | 1.0000 | 1.0000 |
| Temp. | | | 550° C. | | |
| $CH_4$ | 0.4784 | 0.2744 | 0.1797 | 0.1257 | 0.0913 |
| $C_2^+$ | 3.3E−05 | 7.5E−06 | 2.9E−06 | 1.4E−06 | 2.4E−12 |
| $H_2O$ | 0.0511 | 0.1652 | 0.2446 | 0.3031 | 0.3492 |
| $H_2$ | 0.2544 | 0.3680 | 0.3993 | 0.4070 | 0.4053 |
| CO | 0.1361 | 0.0832 | 0.0632 | 0.0517 | 0.0438 |
| $CO_2$ | 0.0800 | 0.1092 | 0.1132 | 0.1125 | 0.1103 |
| Total | 1.0000 | 1.0000 | 1.0000 | 1.0000 | 1.0000 |
| Temp. | | | 600° C. | | |
| $CH_4$ | 0.3942 | 0.2018 | 0.1211 | 0.0776 | 0.0515 |
| $C_2^+$ | 3.1E−05 | 5.9E−06 | 2.0E−06 | 2.3E−12 | 2.3E−12 |
| $H_2O$ | 0.0334 | 0.1206 | 0.1896 | 0.2455 | 0.2932 |
| $H_2$ | 0.3318 | 0.4563 | 0.4850 | 0.4869 | 0.4778 |
| CO | 0.1970 | 0.1401 | 0.1100 | 0.0902 | 0.0756 |
| $CO_2$ | 0.0435 | 0.0812 | 0.0943 | 0.0997 | 0.1018 |
| Total | 1.0000 | 1.0000 | 1.0000 | 1.0000 | 1.0000 |

| S/C | 1.0 | 1.5 | 2.0 | 2.5 | 3.0 | 3.5 |
|---|---|---|---|---|---|---|
| Temp. | | | 700° C. | | | |
| $CH_4$ | 0.0825 | 0.0314 | 0.0142 | 0.0072 | 0.0040 | 0.0023 |
| $C_2^+$ | 2.0E−06 | 3.5E−12 | 2.0E−12 | 2.1E−12 | 2.2E−12 | 2.2E−12 |
| $H_2O$ | 0.0533 | 0.1185 | 0.1845 | 0.2456 | 0.3005 | 0.3492 |
| $H_2$ | 0.5955 | 0.6031 | 0.5773 | 0.5438 | 0.5099 | 0.4781 |
| CO | 0.2395 | 0.1949 | 0.1561 | 0.1260 | 0.1030 | 0.0855 |
| $CO_2$ | 0.02925 | 0.0521 | 0.0679 | 0.0774 | 0.0826 | 0.0849 |
| Total | 1.0000 | 1.0000 | 1.0000 | 1.0000 | 1.0000 | 1.0000 |
| Temp. | | | 750° C. | | | |
| $CH_4$ | 0.0486 | 0.0118 | 0.0045 | 0.0021 | 0.0011 | 0.0007 |
| $C_2^+$ | 1.4E−11 | 1.9E−12 | 2.0E−12 | 2.1E−12 | 2.2E−12 | 2.2E−12 |
| $H_2O$ | 0.0331 | 0.1054 | 0.1798 | 0.2459 | 0.3033 | 0.3533 |
| $H_2$ | 0.6362 | 0.6265 | 0.5865 | 0.5456 | 0.5083 | 0.4746 |
| CO | 0.2666 | 0.2158 | 0.1708 | 0.1374 | 0.1125 | 0.0937 |
| $CO_2$ | 0.0155 | 0.0405 | 0.0584 | 0.0690 | 0.0748 | 0.0777 |
| Total | 1.0000 | 1.0000 | 1.0000 | 1.0000 | 1.0000 | 1.0000 |

TABLE 2

Molar Compositions of Reformed Gasoline
(Assumes 93% C$_8$H$_{18}$ n-Octane and 7% C$_6$H$_{12}$: CH$_2$ (Anti-Knock Agent))

| S/C | 0.5 | 1.0 | 1.5 | 2.0 | 2.5 |
|---|---|---|---|---|---|
| Temp. | | | 200° C. | | |
| CH$_4$ | 0.7361 | 0.5000 | 0.3786 | 0.3046 | 0.2548 |
| C$_2^+$ | 7.2E−06 | 1.3E−06 | 4.9E−07 | 3.4E−07 | 1.4E−07 |
| H$_2$O | 0.0554 | 0.3584 | 0.5142 | 0.6092 | 0.6731 |
| H$_2$ | 5.5E−11 | 5.1E−11 | 5.0E−11 | 4.9E−11 | 4.8E−11 |
| CO | 6.5E−05 | 1.7E−05 | 1.2E−05 | 8.3E−06 | 7.1E−06 |
| CO$_2$ | 0.2084 | 0.1416 | 0.1072 | 0.0862 | 0.0721 |
| Total | 1.0000 | 1.0000 | 1.0000 | 1.0000 | 1.0000 |
| Temp. | | | 250° C. | | |
| CH$_4$ | 0.7320 | 0.4919 | 0.3701 | 0.2962 | 0.2466 |
| C$_2^+$ | 1.3E−05 | 2.2E−06 | 1.0E−06 | 3.2E−12 | 3.2E−12 |
| H$_2$O | 0.0523 | 0.3476 | 0.4998 | 0.5925 | 0.6550 |
| H$_2$ | 0.0063 | 0.0160 | 0.0191 | 0.0207 | 0.0217 |
| CO | 0.0004 | 0.0001 | 7.3E−05 | 5.5E−05 | 4.4E−05 |
| CO$_2$ | 0.2090 | 0.1444 | 0.1109 | 0.095 | 0.0767 |
| Total | 1.0000 | 1.0000 | 1.0000 | 1.0000 | 1.0000 |
| Temp. | | | 300° C. | | |
| CH$_4$ | 0.7262 | 0.4819 | 0.3598 | 0.2861 | 0.2367 |
| C$_2^+$ | 2.0E−05 | 3.4E−06 | 1.6E−06 | 9.5E−07 | 3.1E−12 |
| H$_2$O | 0.0491 | 0.3343 | 0.4822 | 0.5724 | 0.6333 |
| H$_2$ | 0.0139 | 0.0357 | 0.0424 | 0.0457 | 0.0476 |
| CO | 0.0021 | 0.0006 | 0.0004 | 0.0003 | 0.0002 |
| CO$_2$ | 0.2087 | 0.1475 | 0.1152 | 0.0955 | 0.0822 |
| Total | 1.0000 | 1.0000 | 1.0000 | 1.0000 | 1.0000 |
| Temp. | | | 350° C. | | |
| CH$_4$ | 0.7144 | 0.4644 | 0.3422 | 0.2691 | 0.2204 |
| C$_2^+$ | 3.0E−05 | 4.9E−06 | 2.3E−06 | 1.3E−06 | 3.1E−12 |
| H$_2$O | 0.0449 | 0.3122 | 0.4530 | 0.5393 | 0.5978 |
| H$_2$ | 0.0271 | 0.0690 | 0.0814 | 0.0871 | 0.0902 |
| CO | 0.0081 | 0.0022 | 0.0014 | 0.0011 | 0.0009 |
| CO$_2$ | 0.2055 | 0.1522 | 0.1220 | 0.1034 | 0.0907 |
| Total | 1.0000 | 1.0000 | 1.0000 | 1.0000 | 1.0000 |
| Temp. | | | 400° C. | | |
| CH$_4$ | 0.6911 | 0.4374 | 0.3158 | 0.2441 | 0.1968 |
| C$_2^+$ | 4.0E−05 | 6.6E−06 | 2.9E−06 | 1.7E−06 | 3.0E−12 |
| H$_2$O | 0.0415 | 0.2805 | 0.4109 | 0.4921 | 0.5477 |
| H$_2$ | 0.0483 | 0.1181 | 0.1380 | 0.1465 | 0.1505 |
| CO | 0.0247 | 0.0072 | 0.0048 | 0.0037 | 0.0031 |
| CO$_2$ | 0.1944 | 0.1568 | 0.1305 | 0.1136 | 0.1019 |
| Total | 1.0000 | 1.0000 | 1.0000 | 1.0000 | 1.0000 |
| Temp. | | | 450° C. | | |
| CH$_4$ | 0.6486 | 0.3986 | 0.2800 | 0.2111 | 0.1661 |
| C$_2^+$ | 4.8E−05 | 8.1E−06 | 3.5E−06 | 1.9E−06 | 1.1E−06 |
| H$_2$O | 0.0399 | 0.2409 | 0.3579 | 0.4328 | 0.4855 |
| H$_2$ | 0.0824 | 0.1826 | 0.2108 | 0.2218 | 0.2260 |
| CO | 0.0592 | 0.0202 | 0.0137 | 0.0107 | 0.0089 |
| CO$_2$ | 0.1699 | 0.1577 | 0.1376 | 0.1236 | 0.1135 |
| Total | 1.0000 | 1.0000 | 1.0000 | 1.0000 | 1.0000 |
| Temp. | | | 500° C. | | |
| CH$_4$ | 0.5830 | 0.3461 | 0.2342 | 0.1703 | 0.1293 |
| C$_2^+$ | 4.9E−05 | 8.9E−06 | 3.6E−06 | 1.8E−06 | 1.0E−06 |
| H$_2$O | 0.0382 | 0.1975 | 0.2989 | 0.3671 | 0.4170 |
| H$_2$ | 0.1342 | 0.2597 | 0.2951 | 0.3072 | 0.3104 |
| CO | 0.1135 | 0.0481 | 0.0336 | 0.0266 | 0.0222 |
| CO$_2$ | 0.1311 | 0.1486 | 0.1382 | 0.1288 | 0.1211 |
| Total | 1.0000 | 1.0000 | 1.0000 | 1.0000 | 1.0000 |
| Temp. | | | 550° C. | | |
| CH$_4$ | 0.4996 | 0.2794 | 0.1793 | 0.1234 | 0.0885 |
| C$_2^+$ | 4.5E−05 | 8.3E−06 | 3.1E−06 | 1.4E−06 | 7.3E−07 |

TABLE 2-continued

Molar Compositions of Reformed Gasoline
(Assumes 93% $C_8H_{18}$ n-Octane and 7% $C_6H_{12}$: $CH_2$ (Anti-Knock Agent))

| | | | | | |
|---|---|---|---|---|---|
| $H_2O$ | 0.0329 | 0.1544 | 0.2402 | 0.3023 | 0.3507 |
| $H_2$ | 0.2032 | 0.3455 | 0.3842 | 0.3949 | 0.3944 |
| CO | 0.1793 | 0.0957 | 0.0694 | 0.0554 | 0.0462 |
| $CO_2$ | 0.0849 | 0.1250 | 0.1269 | 0.1240 | 0.1202 |
| Total | 1.0000 | 1.0000 | 1.0000 | 1.0000 | 1.0000 |

Temp. 600° C.

| | | | | | |
|---|---|---|---|---|---|
| $CH_4$ | 0.4156 | 0.2048 | 0.1201 | 0.0755 | 0.0492 |
| $C_2^+$ | 4.1E−05 | 6.3E−06 | 2.0E−06 | 7.9E−07 | 2.3E−12 |
| $H_2O$ | 0.0227 | 0.1142 | 0.1875 | 0.2464 | 0.2962 |
| $H_2$ | 0.2776 | 0.4336 | 0.4696 | 0.4740 | 0.4659 |
| CO | 0.2409 | 0.1568 | 0.1188 | 0.0954 | 0.0788 |
| $CO_2$ | 0.0432 | 0.0906 | 0.1040 | 0.1087 | 0.1099 |
| Total | 1.0000 | 1.0000 | 1.0000 | 1.0000 | 1.0000 |

| S/C | 1.0 | 1.5 | 2.0 | 2.5 | 3.0 | 3.5 |
|---|---|---|---|---|---|---|

Temp. 700° C.

| | | | | | | |
|---|---|---|---|---|---|---|
| $CH_4$ | 0.0831 | 0.0302 | 0.0133 | 0.0066 | 0.0036 | 0.0021 |
| $C_2^+$ | 2.1E−06 | 9.1E−12 | 2.1E−12 | 2.2E−12 | 2.2E−12 | 2.3E−12 |
| $H_2O$ | 0.0515 | 0.1197 | 0.1886 | 0.2520 | 0.3085 | 0.3583 |
| $H_2$ | 0.5744 | 0.5872 | 0.5620 | 0.5286 | 0.4947 | 0.4629 |
| CO | 0.2594 | 0.2058 | 0.1621 | 0.1291 | 0.1045 | 0.0861 |
| $CO_2$ | 0.0316 | 0.0571 | 0.0740 | 0.0837 | 0.0887 | 0.0906 |
| Total | 1.0000 | 1.0000 | 1.0000 | 1.0000 | 1.0000 | 1.0000 |

Temp. 750° C.

| | | | | | | |
|---|---|---|---|---|---|---|
| $CH_4$ | 0.0488 | 0.0112 | 0.0042 | 0.0019 | 0.0010 | 0.0006 |
| $C_2^+$ | 1.1E−06 | 1.3E−10 | 2.0E−12 | 2.1E−12 | 2.2E−12 | 2.3E−12 |
| $H_2O$ | 0.0322 | 0.1078 | 0.1851 | 0.2532 | 0.3120 | 0.3630 |
| $H_2$ | 0.6157 | 0.6095 | 0.5699 | 0.5294 | 0.4922 | 0.4588 |
| CO | 0.2866 | 0.2268 | 0.1768 | 0.1406 | 0.1142 | 0.0944 |
| $CO_2$ | 0.0167 | 0.0447 | 0.0640 | 0.0749 | 0.0806 | 0.0832 |
| Total | 1.0000 | 1.0000 | 1.0000 | 1.0000 | 1.0000 | 1.0000 |

As may be seen, the level of methane in the pre-reformed fuel decreases with increasing reforming temperature and increasing steam to carbon ratio.

DESCRIPTION OF THE PREFERRED EMBODIMENT

Embodiments of a process in accordance with the invention will now be illustrated by way of example only with reference to the accompanying drawings in which.

Figure 1:
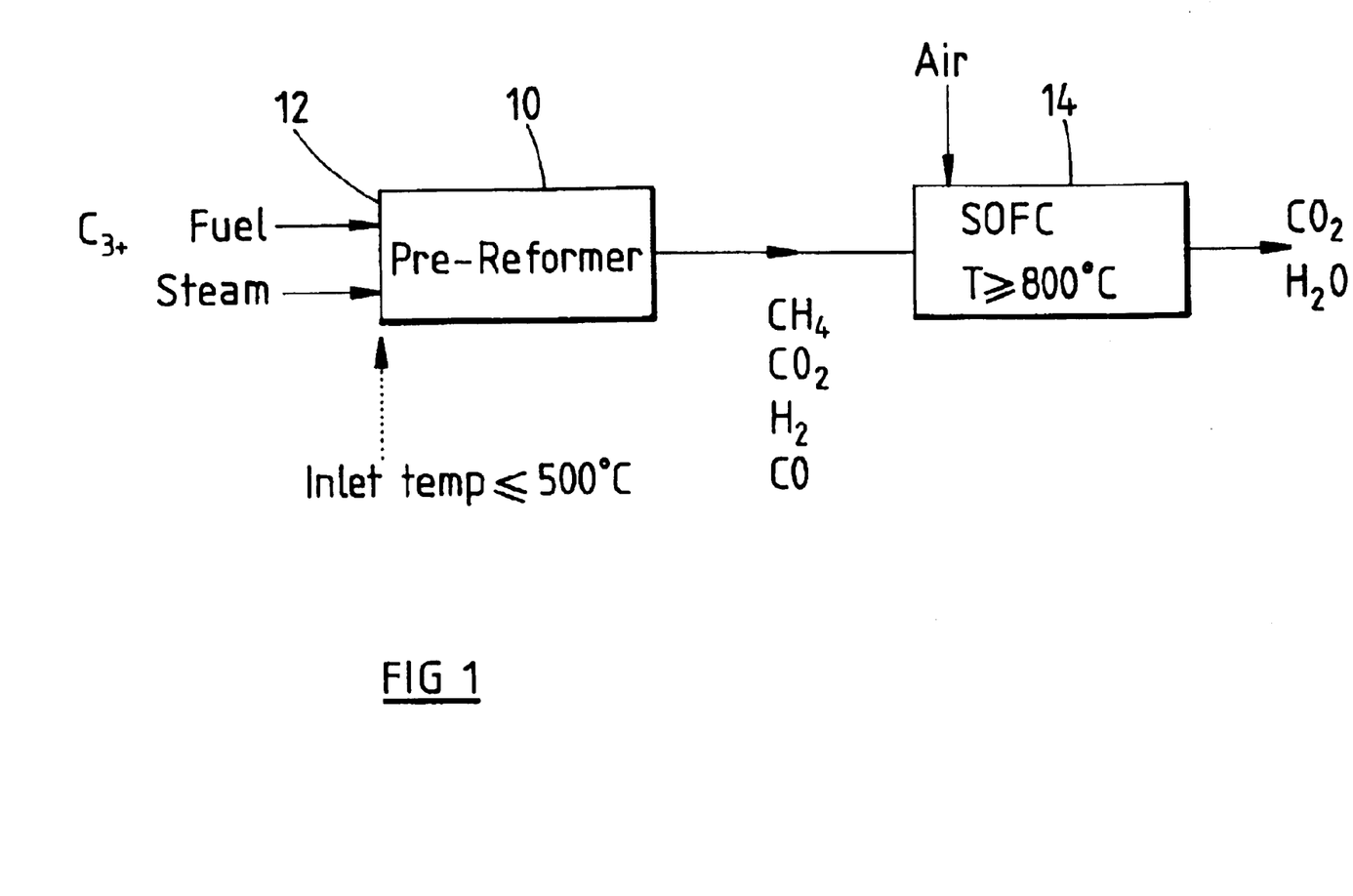
FIG. 1 is a block diagram of the process illustrating a typical steam pre-reformer and an SOFC stack.

Referring to FIG. 1, a steam pre-reformer 10 may take any typical form but is operated adiabatically so that the maximum operating temperature of 500° C. in the pre-reformer is at an inlet end 12.

Waste heat from the SOFC stack 14 may be recycled to the inlet end 12.

Desulphurised heavy hydrocarbon fuel ($C_{2+}$), such as LPG, is introduced to the reformer 10 at the inlet end 12 and steam is also introduced to the reformer, at an S/C ratio of no greater than 2.0. The gas flows are such as to provide a sufficient residence time over the catalyst to achieve at least a 97.5% conversion of the heavy hydrocarbons to methane, hydrogen, carbon dioxide and carbon monoxide. At the maximum temperature of 500° C., the resultant fuel stream should have a minimum methane content, on a wet basis (that is, including the steam in the fuel stream from the pre-reformer) of 20 vol % and, preferably, a greater proportion of methane than hydrogen.

The fuel stream, optionally with steam from the anode outlet side of the fuel cell stack added to it, is introduced to the anode side of the stack 14. The fuel cells operate at a temperature of at least 700° C. and when the fuel stream contacts the nickel/zirconia cermet anodes the methane in the fuel stream is steam reformed to carbon monoxide and hydrogen.

At the same time oxygen, in the form of air, is supplied to the cathode side of the fuel cell stack and, when the fuel cell stack is short-circuited through an external load (not shown), the fuel oxidises at the anodes resulting in a $CO_2$ and $H_2O$ waste stream.

EXAMPLES

Example 1

Using a steam pre-reforming process to produce high levels of methane, propane was subjected to steam reforming using a commercially available catalyst at two different maximum temperatures of 378° C. and 328° C. and at a variety of S/C ratios. The catalyst was a nickel-based pre-reformer catalyst C11-PR supplied by United Catalysts Corporation. The measured conversions given in Table 3 illustrate that the results predicted by the thermodynamic calculations given above can be at least approached. The steam reforming was conducted adiabatically in a microreactor system with on-line analysis of the gas compositions. It is to be noted that the experimental set-up was not ideal, and it is believed that this accounts for the incomplete conversions. All conversions would usually be expected to be at least 97.5% complete with appropriate residence times over the catalyst to ensure this. All percentages are vol % and are given on a dry basis.

TABLE 3

| Temp (° C.) | Steam/ Carbon ratio | Steam/ Gas ratio | $H_2$ % | CO % | $CH_4$ % | $CO_2$ % | $C_3H_8$ % | Conversion of Propane |
|---|---|---|---|---|---|---|---|---|
| 378 | 1.37 | 4.11 | 34 | 2.4 | 48.9 | 14.2 | 0.6 | 97.5 |
| 328 | 1.37 | 4.11 | 15.4 | 2 | 62.7 | 15 | 4.8 | 84.6 |
| 328 | 1.01 | 3.03 | 24.4 | 3.8 | 56.5 | 12.4 | 3 | 89.2 |
| 328 | 0.75 | 2.25 | 21.4 | 1.6 | 61.1 | 13.1 | 3.1 | 89.0 |
| 328 | 0.5 | 1.5 | 17.3 | 1.6 | 64.6 | 12.9 | 3.6 | 88.2 |

Examples 2–4

Further experiments were conducted on the production of a methane-rich fuel for internal reforming on SOFC anodes from LPG available in Victoria, Australia ("Victorian LPG") in a prototype steam pre-reformer. The composition of Victorian LPG varies from 100% propane to a mix of propane, butane and/or ethane. The composition of the LPG used during this work was 93% propane and 7% ethane.

The experiments were carried out in a prototype fuel processor with 0.6L of the aforementioned commercial pre-reforming catalyst C11-PR. Operating conditions were chosen to have higher methane content in the reformed gas than is normally generated from conventional pre-reforming of propane and ethane, with a sufficient residence time over the catalyst to give 100% conversion of the propane and ethane. The results of the experiments are given below, together with the operating conditions. It should be noted that the results are given on a dry basis.

Example 2

Temp: 353–380° C., Steam/Carbon=1.5.
$CH_4$: 48.3
$H_2$: 30.6
$CO_2$: 21.1
CO: 0.0
$C_3H_8$: 0.0
$C_2H_6$: 0.0

Example 3

Temp: 361–393° C., Steam/Carbon=10.0.
$CH_4$: 54.9
$H_2$: 25.0
$CO_2$: 20.1
CO: 0.0
$C_3H_8$: 0.0
$C_2H_6$: 0.0

Example 4

Temp: 367–402° C., Steam/Carbon=0.75.
$CH_4$: 57.9
$H_2$: 22.5
$CO_2$: 19.5
CO: 0.0
$C_3H_8$: 0.0
$C_2H_6$: 0.0

The above examples confirm that it is possible to steam reform heavy hydrocarbons ($C_{3+}$) at relatively low temperatures and achieve both at least 20 vol % methane on a wet basis in the resultant fuel stream and at least 97.5% conversion of the heavy hydrocarbons.

Example 5

In this example a gas comprising approximately 28 vol % $CH_4$, 22 vol % $H_2$, 12 vol % $CO_2$, 1 vol % CO and 37 vol % $H_2O$ was supplied to a fuel cell for internal reforming and electricity production.

As may be seen from Table 1 (molar % and vol % are substantially the same) the gas composition simulated LPG (85 vol % propane, 15 vol % butane) which has been steam reformed at 450° C. and an S/C ratio of 1.5.

The single fuel cell was a standard planar SOFC with a 50 micron thick cathode layer of strontium doped lanthanum manganite (LSM) on one side of a 120 micron thick electrolyte layer of dense 3 mol % yttria stabilised zirconia (3YSZ) and a 50 micron thick anode layer of 50% Ni-3YSZ cermet on the other side of the electrolyte layer. The fuel cell was mounted in a closed ceramic housing with a fuel side inlet and outlet and fuel gas flow channels on the anode side and an air side inlet and outlet and air flow channels on the cathode side. A seal was provided in the housing around the fuel cell to prevent mixing of the fuel gas and air. Electrical current was taken off using Ni mesh in contact with the anode, between the anode and the anode side of the housing, and a Pt mesh in contact with the cathode, between the cathode and the cathode side of the housing.

Figure 2:
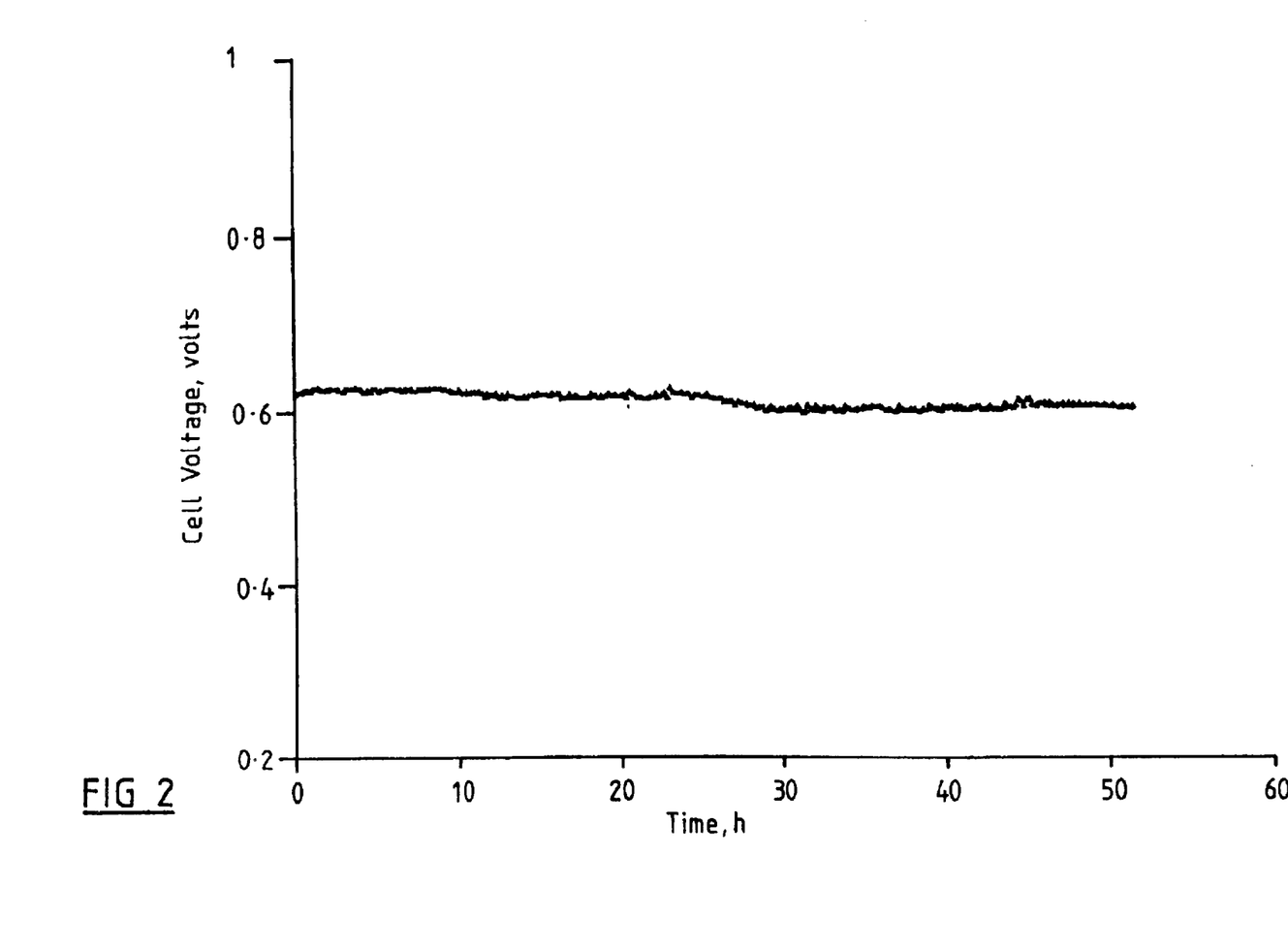
FIG. 2 is a graph representing cell output voltage over time.

The fuel cell was heated to 930° C. and the fuel gas was supplied to the anode side inlet while air was supplied to the cathode side inlet. At this temperature, the methane in the fuel gas was internally steam reformed on the anode to hydrogen and oxides of carbon which were then oxidised on the anode as a result of the fuel reaction. The resultant voltage output from the fuel cell was measured for a period of about 55 hours and is shown in FIG. 2.

Over extended periods of time substantially greater than 55 hours, it is possible that some carbon deposition from the methane internal reforming reaction may detrimentally affect the fuel cell performance. A variety of approaches have been put forward to alleviate this, of which the addition of promoters to Ni steam reforming catalysts may be particularly appropriate in the present invention, should it prove necessary.

Such promoters include alkali metals (eg Na, K) and alkali earth metals (Mg, Ca, Sr, Ba) (J. R. Rostrup-Nielson in Catalysis Science and Technology, Volume 5, Springer, Berlin, 1984, p1). Alkali additions are not advisable for SOFC anodes, but alkali earth additions (Mg, Ca, Sr, Ba) and ceria additions have been demonstrated for suppression of carbon deposition {P. Singh et al., U.S. Pat. No. 4,894,297 (1990); V. D. Belyaev et al, Applied Catalysis A, 133, p47(1995)}. Addition of Mo-oxide has also been shown to be effective for carbon deposition suppression (R. H. Cunningham et al, Solid Oxide Fuel Cells 5, Proceedings Volume 97–40, The Electrochemical Society, Pennington, N.J., 1997, p973).

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps, features, compositions and compounds.

The reference to any prior art in this specification is not, and should not be taken as, an acknowledgment or any form of suggestion that that prior art forms part of the common general knowledge in Australia or elsewhere.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. A process for producing electricity in a fuel cell which comprises reacting a higher carbon ($C_{2+}$) hydrocarbon fuel with steam in a steam pre-reformer at a temperature in the pre-reformer of no greater than 500° C. to produce a fuel stream including hydrogen and no less than about 20% by volume methane measured on a wet basis, and supplying the fuel stream and an oxidant to a high temperature fuel cell, said fuel cell having an anode comprising a material that catalyzes methane reforming reactions, whereby in the fuel cell methane in the fuel stream is reformed at the anode to produce hydrogen, and electricity is produced by reacting hydrogen at the anode and by reacting the oxidant at a cathode of the fuel cell, said reactions at the fuel cell anode and cathode occurring at a temperature of at least 650° C.

2. A process according to claim 1 in which the fuel stream includes no less than about 25% by volume methane measured on a wet basis.

3. A process according to claim 1 in which the fuel stream includes no less than about 40% by volume methane measured on a wet basis.

4. A process according to claim 1 in which the temperature in the steam pre-reformer is no more than about 450° C.

5. A process according to claim 1 in which the reaction of the fuel with steam in the methane generator is performed adiabatically.

6. A process according to claim 1 in which the steam to carbon ratio in the methane generator is no more than 1.5.

7. A process according to claim 6 in which additional steam is introduced to the fuel stream downstream of the steam pre-reformer.

8. A process according to claim 7 in which the additional steam is recycled from an anode exhaust stream.

9. A process according to claim 1 in which the fuel is a $C_{3+}$ hydrocarbon fuel.

10. A process according to claim 9 in which the fuel is selected from the group consisting of LPG, gasoline (petrol) and diesel.

11. A process according to claim 1 in which the fuel is selected from the group consisting of ethane, propane, butane, LPG, gasoline (petrol), diesel, kerosene, fuel oil, jet oil, naphtha and mixtures of two or more of these.

12. A process according to claim 1 in which the reaction at the anode of the fuel cell is performed at a temperature of at least 700° C.

13. A process according to claim 1 in which waste heat from the fuel cell is recycled to the steam pre-reformer.

14. A process according to claim 1 in which the reaction in the steam pre-reformer results in the conversion of at least 97.5% of the higher carbon ($C_{2+}$) hydrocarbon fuel.

15. A process according to claim 14 which results in at least substantially complete conversion of the higher carbon ($C_{2+}$) hydrocarbon fuel.

16. A process according to claim 1 in which the fuel stream includes no less than about 50% by volume methane measured on a wet basis.

17. A process according to claim 1 in which the fuel stream includes no less than about 60% by volume methane measured on a wet basis.

18. A process according to claim 1 in which the temperature in the steam pre-reformer is in a range of about 250° C. to 450° C.

19. A process according to claim 1 in which the temperature in the steam pre-reformer is in the range of about 300° C. to 400° C.

20. A process according to claim 6 in which the steam to carbon ration in the methane generator is no more than 1.25.

21. A process according to claim 6 in which the steam to carbon ration in the methane generator is no more than 1.0.

* * * * *